Patented Mar. 1, 1938

2,109,593

UNITED STATES PATENT OFFICE 2,109,593

CELLULOSE ACETATE MOLDING COMPOSITIONS

Maurice L. Macht, Jersey City, and David A. Fletcher, Arlington, N. J., assignors to E. I. du Pont de Nemours & Company, Wilmington, Del., a corporation of Delaware No Drawing. Application October 28, 1936, Serial No. 108,098

10 Claims. (Cl. 106—40)

This invention relates to the preparation of molding compounds of cellulose acetate, and more particularly to the formulation of such compounds having unique properties.

It is ordinarily required that articles molded from compounds of a base of cellulose acetate possess a considerable degree of rigidity as well as of toughness, that the material be of high softening temperature and of low burning rate, and that the molded article be free from exudation. At the same time it is required, particularly when the molding is done by the method of injection, that the compound have a satisfactory degree of mobility at a reasonable molding temperature, so that it can be molded satisfactorily and rapidly.

In compression molding, if the molding compound does not flow readily when heated, it will require either the application of excessive temperature, or of molding temperature for an excessive time, either of which is almost certain to cause discoloration and even may cause decomposition and bubbling of the mass, or else the use of abnormally high pressure, which is objectionable not only because of the cost of applying such pressure, in that the equipment must be made correspondingly massive and rugged, but also because dies may be definitely and permanently damaged by being subjected to molding pressures above the ordinary range.

In injection molding it is even more important that a high degree of mobility be developed without the use of excessive temperature, both because the duration of the heating is ordinarily longer than in compression molding and because the process is dependent, for economical operation, upon the ease of flow of the heated material through a restricted orifice. It is particularly desirable that an injection molding compound have a high rate of softening with increase of temperature, or, otherwise stated, that the interval between molding temperature and softening temperature be comparatively small, so that the molded mass will quickly become rigid in the unheated injection die.

The requirements of mobility, toughness and rigidity are characteristically contradictory, so that it has been difficult or impossible to meet them all in a single composition. Thus rigidity is ordinarily predicated upon relatively low plasticizer content, and this in turn makes the material less readily moldable, so that unless the conditions of molding are extreme, it is likely to be inadequately welded by the molding process, and hence deficient in strength and toughness. An increase of plasticizer content, in order to make the molding more easy, will have the result ordinarily of improving the toughness, both inherently and because a readily molded composition becomes more thoroughly welded in the molding; but the increase of plasticizer content diminishes the rigidity of the mass and also has the result of depressing the softening temperature of the molded article, thus limiting the utility of the article and necessitating the application of more drastic cooling in order to harden the article sufficiently for removal from the mold.

It is an object of the present invention to formulate molding compounds of a base of cellulose acetate which have unique characteristics of easy molding, whether by the compression or by the injection method, and which at the same time yield articles of a degree of rigidity and a degree of toughness not heretofore associated with such molding characteristics, and which furthermore are free from exudation under extreme conditions. A further object is to suppress the exudation of certain plasticizers. Other objects will appear hereinafter.

These objects are accomplished, in accordance with the present invention, by compositions comprising, per 100 parts of cellulose acetate, from 20 to 60 parts of certain mixtures of plasticizers, of which mixtures from 8 to 38 percent is camphor, and the balance either (A) one or more plasticizers of toughening exuding type, or (B) from 31 to 69 percent of toughening exuding plasticizer together with from 23 to 31 percent of fire-retarding plasticizer, or (C) from 25 to 67 percent of toughening exuding plasticizer together with from 23 to 31 percent of fire-retarding plasticizer and from 2 to 6 percent of an aryl sulphonamide plasticizer, the said toughening exuding, fire-retarding and aryl sulphonamide plasticizers being selected from respective groups hereinafter enumerated.

The invention rests upon the discovery of the unexpected results of certain combinations of known plasticizers.

There is recognized in the art a more or less well-defined class of plasticizers, including individuals of chemically diverse nature, characterized in common by producing, in conjunction with cellulose acetate, compositions of distinct toughness, but characterized also by having some tendency to exude from the finished molded article, when used in conjunction with cellulose acetates in the lower ranges of acetic number, such as those of between about 48 and 53 which are the most frequently used in the manufacture of plastics. Some of them, when used with cellulose acetates of higher acetic numbers, such as those of between about 53 and 54.5 are comparatively unobjectionable in this respect. Exudation, however, is frequently aggravated by the presence, in the composition, of mold lubricants, the use of which is very generally desirable. To prevent exudation it has frequently been necessary to restrict rather severely the proportion of such a plasticizer used.

Among these toughening exuding plasticizers may be named diethyl phthalate, dimethoxy ethyl phthalate, triethyl citrate, diethylene glycol di-isobutyrate, diethylene glycol dipropionate, dimethyl hexahydro phthalate, diethyl adipate, methyl phthalyl ethyl glycollate and ethyl phthalyl ethyl glycollate.

Triphenyl phosphate is the most important member of an established class of fire-retarding plasticizers. It has been fully recognized, however, that the proportion of it which may be used is distinctly limited because of its comparatively weak plasticizing action and poor compatibility with cellulose acetate, which result in brittleness and exudation. In general, it has been used solely to take advantage of its fire-retarding property where this overbalances its inherent disadvantages in other respects. Other plasticizers used for the same purpose and subject to similar limitations are tricresyl phosphate and trithio phenyl phosphate. Tributyl phosphate has fire-retarding character, and also shares the general properties of the toughening exuding plasticizers.

The aryl sulphonamide plasticizers have come to be recognized by lack of strong solvent power toward cellulose acetate except with the assistance of heat or a suitably selected proportion of solvent, and by a rather strong tendency to exude from such compound when used without other plasticizers, or even with certain other plasticizers. The aryl sulphonamide plasticizers have also a tendency to produce brittle compounds of poor stability toward light and heat.

Members of this group of aryl sulphonamide plasticizers of primary interest in the present invention include para toluol sulphonamide, mixture of ortho and para toluol sulphonamides, para toluol ethyl sulphonamide, mixture of ortho and para toluol ethyl sulphonamides together with the closely related compound para toluol sulphonanilide.

Other individuals of related character, which approach more or less closely in behavior to those enumerated, are benzol sulphonamide, acetanilide, methyl acetanilide, ethyl acetanilide, acetamide, p-toluene monocyclo hexyl sulphonamide.

Exudation frequently results also from the use of certain substances incorporated as lubricants, e. g. ethyl palmitate, aluminum palmitate, zinc stearate, stearic acid, carnauba wax, japan wax, "Lorol", a mixture of saturated fatty alcohols derived from the hydrogenation of cocoanut oil acids, in which lauryl alcohol predominates, "Lorol" phthalate, the phthalic acid esters of this mixture, "C18 alcohol", a mixture of saturated fatty alcohol isomers, chiefly of straight chain type and chiefly with 18 carbon atoms in the chain.

Camphor, which is well known as the standard plasticizer for cellulose nitrate, has been disclosed as a plasticizer for cellulose acetate, but has had practically no commercial use as such, because it is at best a poor solvent for cellulose acetate, tending to yield articles which are weak and brittle, and because further, perhaps of poor compatibility, it was tended to evaporate rapidly from the finished product.

The present invention rests primarily upon the surprising discovery not only that camphor will check the tendency to exudation on the part of other plasticizers and of lubricants, from cellulose acetate compounds, but also that its presence in the compound, both per se and through its effect of permitting the use of larger proportions of certain other plasticizers, serves as a means of increasing flowability and moldability without adverse effects upon toughness, stiffness and softening temperature. When compounded to provide a product of a given stiffness, the mixtures of the present invention are superior to those heretofore known in adaptability to molding processes, particularly the more exacting process of injection molding, and in toughness as measured by the impact test (A. S. T. M. test D256-34T). Also they yield molded articles of superior gloss.

The invention resides further in the discovery of the ranges of proportion of camphor and of other types of plasticizers which may be used to achieve these desirable results.

When plasticizers of the toughening exuding type are used without other plasticizer, the resulting compound may have a satisfactory toughness, but it is subject to exudation, particularly in the presence of lubricants, and has certain deficiencies in molding characteristics which are particularly evident when the molding is done by injection, in that the material does not flow smoothly and does not come out of the mold with a high gloss. Examination of the molded article gives evidence of a non-homogeneity of structure resulting evidently from a premature hardening of the material by cooling before the completion of the filling of the mold. When it is attempted to overcome the defects of molding by increasing the content of plasticizer, the result is to emphasize the exudation, and also to impair the rigidity of the material and lower its softening temperature, both to an undesirable degree.

When a proper proportion of the toughening exuding plasticizer in such composition is replaced by camphor, to form compositions such as are hereinafter referred to as of type A, the exudation of the toughening plasticizer is suppressed, and it thus becomes feasible to use such plasticizers in substantial proportions. The smoothness of flow of the resulting compound in injection molding is completely satisfactory, and the molded article as taken from the mold is homogeneous and of high gloss. Furthermore, in spite of this greater facility of molding, such a compound yields a molded article which, for a given total plasticizer content, is superior in rigidity to those of compositions containing no plasticizer other than one or more of the toughening exuding group.

If triphenyl phosphate, or one of the other fire-retarding plasticizers herein named, is introduced into a composition of type A, replacing a corresponding proportion of plasticizer in such a way that the relative proportions of camphor, fire-retarding plasticizer and toughening exuding plasticizer are within the range herein set forth as part of the present invention, the resulting material, designated herein as of type B, has the advantageous properties already mentioned as characteristic of compounds of type A and in addition is of comparatively low burning rate. This is in marked distinction to the compositions which result from the use of combinations of toughening exuding plasticizers and fire-retarding plasticizers of the group mentioned, in the absence of camphor; such compositions do not have, for a given rigidity of article, the outstandingly desirable molding properties which are of particular value and importance in injection molding, nor are they, in general, free from exudation; except for their lower burning rates they are substantially the equivalents of compositions in which the only plasticizer used is one of those designated as toughening and exuding.

A further variation in the formulation in accordance with the invention results in what is herein to be referred to as type C, in which a small proportion of an aryl sulphonamide plasticizer is substituted for other plasticizer in a composition of type B; so that the composition contains toughening exuding plasticizer, fire-retarding plasticizer, aryl sulphonamide plasticizer and camphor within the operative ranges of proportions herein set forth. Compositions of this type C have, for a given total plasticizer content, even better molding characteristics, particularly for injection molding, than those of compositions of type B, but it is recognized that this advantage is gained at the sacrifice of some degree of stability toward light and heat, since the sulphonamide plasticizer is likely to introduce some degree of sensitivity to these influences. A practical limit upon the proportion of aryl sulphonamide plasticizer is set by this factor and by the tendency of these plasticizers to reduce the toughness of the molded article.

It has been found that in compositions made in accordance with this invention the total plasticizer content is desirably between about 20 and 60 parts per 100 parts of cellulose acetate. Compositions over this entire range are useful in compression molding, while compositions containing from about 35 to 60 parts of plasticizer are particularly desirable for use in injection molding.

Of the total plasticizer content, the content of camphor should range from 8 to 38 per cent, and the preferred percentage is from 13 to 17.

The remainder of the plasticizer content, i. e., from 92 to 62 percent of the plasticizer content, may be constituted of one of the toughening exuding plasticizers already mentioned, or of a mixture of such a plasticizer with triphenyl phosphate or one of the other fire-retarding plasticizers already mentioned, or of a mixture with such plasticizer and, in addition, one of the sulphonamide plasticizers. These combinations will be defined under the respective designations of types A, B and C.

Type A—This contains—

| | Parts |
|---|---|
| Cellulose acetate | 100 |
| Total plasticizer | 20 to 60 | and its plasticizer content is made up of—

| | Percent |
|---|---|
| Camphor | 8 to 38; preferred 13 to 17 |
| Toughening exuding plasticizer | 92 to 62; preferred 87 to 83 |

Type B—This contains—

| | Parts |
|---|---|
| Cellulose acetate | 100 |
| Total plasticizer | 20 to 60 | and its plasticizer content is made up of—

| | Percent |
|---|---|
| Camphor | 8 to 38; preferred 13 to 17 |
| Fire-retarding plasticizer | 23 to 31; preferred 24 to 28 |
| Toughening exuding plasticizer | 31 to 69; preferred 55 to 65 |

Type C—This contains—

| | Parts |
|---|---|
| Cellulose acetate | 100 |
| Total plasticizer | 20 to 60 | and its plasticizer content is made up of—

| | Percent |
|---|---|
| Camphor | 8 to 38; preferred 13 to 17 |
| Fire-retarding plasticizer | 23 to 31; preferred 24 to 28 |
| Aryl sulphonamide plasticizer | 2 to 6; preferred 3 to 5 |
| Toughening exuding plasticizer | 25 to 67; preferred 50 to 60 |

In general the larger proportions of camphor, within the stated range, will be desirable with cellulose acetates of low acetic numbers, and the smaller proportions with those of high acetic numbers.

The benefits resulting from the presence of camphor in compositions of types B and C extend also in large degree to modifications of such compositions in which a non-exuding toughening plasticizer such as dimethyl phthalate is substituted for part or all of the exuding toughening plasticizer.

It will be understood that there may be present in these compositions, in addition to the cellulose acetate and plasticizers, the proportions of which form parts of the present invention, other ingredients also, in minor proportions as normally met with in molding compounds heretofore known, and including dyestuffs and pigments in quantities required for coloration, residual volatile solvents and mold lubricants.

Lubricants are normally desirable, particularly when the compound is to be molded by injection.

The following examples are given to illustrate the invention. In these examples parts are given by weight, with additional figures in parentheses showing the percentage ratios of the contents of individual plasticizers to the total content of plasticizers in the respective compositions.

*Example 1*

| | Parts |
|---|---|
| Cellulose acetate | 100 |
| Camphor (15%) | 8 |
| Dimethoxyethyl phthalate (85%) | 46 |
| (Total plasticizer | 54) |

*Example 2*

| | Parts |
|---|---|
| Cellulose acetate | 100 |
| Camphor (18.8%) | 9 |
| Methyl phthalyl ethyl glycollate (81.2%) | 39 |
| (Total plasticizer | 48) |

*Example 3*

| | Parts |
|---|---|
| Cellulose acetate | 100 |
| Camphor (16%) | 8 |
| Dimethoxyethyl phthalate (44%) | 22 |
| Diethyl phthalate (40%) | 20 |
| (Total plasticizer | 50) |

Example 4

| | | Parts |
|---|---|---|
| Cellulose acetate | | 100 |
| Camphor | (29.4%) | 15 |
| Dimethoxyethyl phthalate | (70.6%) | 36 |
| (Total plasticizer | | 51) |

Example 5

| | | Parts |
|---|---|---|
| Cellulose acetate | | 100 |
| Camphor | (28%) | 15 |
| Diethyl phthalate | (72%) | 39 |
| (Total plasticizer | | 52) |

Example 6

| | | Parts |
|---|---|---|
| Cellulose acetate | | 100 |
| Camphor | (8%) | 4 |
| Dimethoxyethyl phthalate | (92%) | 46 |
| (Total plasticizer | | 50) |

Example 7

| | | Parts |
|---|---|---|
| Cellulose acetate | | 100 |
| Camphor | (8%) | 2 |
| Dimethoxyethyl phthalate | (92%) | 23 |
| (Total plasticizer | | 25) |

Example 8

| | | Parts |
|---|---|---|
| Cellulose acetate | | 100 |
| Camphor | (8.3%) | 5 |
| Diethyl phthalate | (91.7%) | 55 |
| (Total plasticizer | | 60) |

Example 9

| | | Parts |
|---|---|---|
| Cellulose acetate | | 100 |
| Camphor | (35%) | 7 |
| Diethyl phthalate | (65%) | 13 |
| (Total plasticizer | | 20) |

Example 10

| | | Parts |
|---|---|---|
| Cellulose acetate | | 100 |
| Camphor | (38%) | 22 |
| Dimethoxyethyl phthalate | (62%) | 36 |
| (Total plasticizer | | 58) |

Example 11

| | | Parts |
|---|---|---|
| Cellulose acetate | | 100 |
| Camphor | (15%) | 6 |
| Triethyl citrate | (85%) | 34 |
| (Total plasticizer | | 40) |

Example 12

| | | Parts |
|---|---|---|
| Cellulose acetate | | 100 |
| Camphor | (14.5%) | 8 |
| Triphenyl phosphate | (27.3%) | 15 |
| Dimethyl phthalate | (58.2%) | 32 |
| (Total plasticizer | | 55) |

Example 13

| | | Parts |
|---|---|---|
| Cellulose acetate | | 100 |
| Camphor | (18%) | 9 |
| Triphenyl phosphate | (24%) | 12 |
| Triethyl citrate | (20%) | 10 |
| Dimethoxyethyl phthalate | (38%) | 19 |
| (Total plasticizer | | 50) |

Example 14

| | | Parts |
|---|---|---|
| Cellulose acetate | | 100 |
| Camphor | (28.8%) | 15 |
| Triphenyl phosphate | (28.8%) | 15 |
| Dimethoxyethyl phthalate | (42.4%) | 22 |
| (Total plasticizer | | 52) |

Example 15

| | | Parts |
|---|---|---|
| Cellulose acetate | | 100 |
| Camphor | (30%) | 15 |
| Triphenyl phosphate | (30%) | 15 |
| Diethyl phthalate | (40%) | 20 |
| (Total plasticizer | | 50) |

Example 16

| | | Parts |
|---|---|---|
| Cellulose acetate | | 100 |
| Camphor | (8%) | 4 |
| Triphenyl phosphate | (24%) | 12 |
| Dimethoxyethyl phthalate | (68%) | 35 |
| (Total plasticizer | | 51) |

Example 17

| | | Parts |
|---|---|---|
| Cellulose acetate | | 100 |
| Camphor | (8%) | 1.6 |
| Triphenyl phosphate | (25%) | 5 |
| Diethyl phthalate | (67%) | 13.4 |
| (Total plasticizer | | 20) |

Example 18

| | | Parts |
|---|---|---|
| Cellulose acetate | | 100 |
| Camphor | (8.3%) | 5 |
| Tributyl phosphate | (23.4%) | 14 |
| Dimethoxyethyl phthalate | (68.3%) | 41 |
| (Total plasticizer | | 60) |

Example 19

| | | Parts |
|---|---|---|
| Cellulose acetate | | 100 |
| Camphor | (14.5%) | 3.2 |
| Triphenyl phosphate | (27.3%) | 6 |
| Diethyl phthalate | (58.2%) | 12.8 |
| (Total plasticizer | | 22) |

Example 20

| | | Parts |
|---|---|---|
| Cellulose acetate | | 100 |
| Camphor | (36%) | 9 |
| Tricresyl phosphate | (24%) | 6 |
| Diethyl phthalate | (20%) | 5 |
| Dimethyl phthalate | (20%) | 5 |
| (Total plasticizer | | 25) |

Example 21

| | | Parts |
|---|---|---|
| Cellulose acetate | | 100 |
| Camphor | (37.5%) | 21 |
| Triphenyl phosphate | (25%) | 14 |
| Dimethoxyethyl phthalate | (37.5%) | 21 |
| (Total plasticizer | | 56) |

Example 22

| | | Parts |
|---|---|---|
| Cellulose acetate | | 100 |
| Camphor | (14.5%) | 6.3 |
| Triphenyl phosphate | (27.3%) | 11.7 |
| Dimethyl phthalate | (58.2%) | 25 |
| (Total plasticizer | | 43) |

Example 23

| | | Parts |
|---|---|---|
| Celluloes acetate | | 100 |
| Camphor | (20%) | 8 |
| Triphenyl phosphate | (30%) | 12 |
| Dimethoxyethyl phthalate | (37.5%) | 15 |
| Tributyl phosphate | (12.5%) | 5 |
| (Total plasticizer | | 40) |

Example 24

| | Parts |
|---|---|
| Cellulose acetate | 100 |
| Camphor (8%) | 4 |
| Triphenyl phosphate (24%) | 12 |
| Dimethoxyethyl phthalate (68%) | 34 |
| (Total plasticizer | 50) |

Example 25

| | Parts |
|---|---|
| Cellulose acetate | 100 |
| Camphor (13.9%) | 6 |
| Triphenyl phosphate (26.3%) | 11.3 |
| Mixture of ortho and para toluol sulphonamides (3.5%) | 1.5 |
| Diethyl phthalate (56.3%) | 24.2 |
| (Total plasticizer | 43) |

Example 26

| | Parts |
|---|---|
| Cellulose acetate | 100 |
| Camphor (14%) | 7 |
| Triphenyl phosphate (26%) | 13 |
| Mixture of ortho and para toluol sulphonamides (4%) | 2 |
| Diethyl phthalate (56%) | 28 |
| (Total plasticizer | 50) |

Example 27

| | Parts |
|---|---|
| Cellulose acetate | 100 |
| Camphor (23.3%) | 14 |
| Triphenyl phosphate (23.3%) | 14 |
| Mixture of ortho and para toluol sulphonamides (3.3%) | 2 |
| Diethyl phthalate (50.1%) | 30 |
| (Total plasticizer | 60) |

Example 28

| | Parts |
|---|---|
| Cellulose acetate | 100 |
| Camphor (20%) | 8 |
| Triphenyl phosphate (30%) | 12 |
| Para toluol sulphonamide (2.5%) | 1 |
| Dimethoxyethyl phthalate (47.5%) | 19 |
| (Total plasticizer | 40) |

Example 29

| | Parts |
|---|---|
| Cellulose acetate | 100 |
| Camphor (16.7%) | 8 |
| Triphenyl phosphate (25%) | 12 |
| Para toluol ethyl sulphonamide (5.2%) | 2.5 |
| Diethyl phthalate (53.1%) | 25.5 |
| (Total plasticizer | 48) |

Example 30

| | Parts |
|---|---|
| Cellulose acetate | 100 |
| Camphor (19.7%) | 11 |
| Triphenyl phosphate (30.4%) | 17 |
| Mixture of ortho and para toluol sulphonamides (2.7%) | 1.5 |
| Diethyl adipate (47.2%) | 26.5 |
| (Total plasticizer | 56) |

Example 31

| | Parts |
|---|---|
| Cellulose acetate | 100 |
| Camphor (10%) | 2 |
| Tricresyl phosphate (25%) | .5 |
| Mixture of ortho and para toluol sulphonamides (5%) | 1 |
| Diethyl phthalate (60%) | 12 |
| (Total plasticizer | 20) |

Example 32

| | Parts |
|---|---|
| Cellulose acetate | 100 |
| Camphor (8%) | 4.25 |
| Triphenyl phosphate (28.3%) | 15 |
| Mixture of ortho and para toluol sulphonamides (4.2%) | 2.25 |
| Diethyl phthalate (59.5%) | 31.5 |
| (Total plasticizer | 53) |

Example 33

| | Parts |
|---|---|
| Cellulose acetate | 100 |
| Camphor (8.3%) | 5 |
| Triphenyl phosphate (28.4%) | 17 |
| Mixture of ortho and para toluol sulphonamides (3.3%) | 2 |
| Diethyl phthalate (60%) | 36 |
| (Total plasticizer | 60) |

Example 34

| | Parts |
|---|---|
| Cellulose acetate | 100 |
| Camphor (36%) | 9 |
| Triphenyl phosphate (30%) | 7.5 |
| Para toluol sulphonamide (6%) | 1.5 |
| Dimethoxyethyl phthalate (28%) | 7 |
| (Total plasticizer | 25) |

Example 35

| | Parts |
|---|---|
| Cellulose acetate | 100 |
| Camphor (32%) | 16 |
| Triphenyl phosphate (30%) | 15 |
| Mixture of ortho and para ethyl toluol sulphonamides (6%) | 3 |
| Diethylene glycol di-isobutyrate (10%) | 5 |
| Dimethyl phthalate (22%) | 11 |
| (Total plasticizer | 50) |

Example 36

| | Parts |
|---|---|
| Cellulose acetate | 100 |
| Camphor (36.9%) | 21 |
| Triphenyl phosphate (30.7%) | 17.5 |
| Mixture of ortho and para toluol sulphonamides (5.3%) | 3 |
| Diethyl phthalate (27.1%) | 15.5 |
| (Total plasticizer | 57) |

Example 37

| | Parts |
|---|---|
| Cellulose acetate | 100 |
| Camphor (15.4%) | 8 |
| Triphenyl phosphate (23%) | 12 |
| Para toluol ethyl sulphonamide (2.9%) | 1.5 |
| Dimethyl hexahydrophthalate (20.2%) | 10.5 |
| Dimethyl phthalate (38.5%) | 20 |
| (Total plasticizer | 52) |

Example 38

| | Parts |
|---|---|
| Cellulose acetate | 100 |
| Camphor (14%) | 8 |
| Triphenyl phosphate (26.3%) | 15 |
| Mixture of ortho and para toluol sulphonamides (3.5%) | 2 |
| Diethyl phthalate (56.2%) | 32 |
| (Total plasticizer | 57) |

It will be understood that the above examples are merely illustrative and that a large number of compositions may be made up according to the present invention with the range of total plasticizer embraced by the invention and within the ranges of proportion of the several plasticizers within this total. Dyestuffs, pigments and lubricants are not included in the compositions given in the examples, since they will be selected and proportioned according to conventional practice in the art. The presence of moisture due to the hygroscopicity of the cellulose acetate is to be assumed, together with a residual volatile solvent if such is characteristically the result of a selected process of manufacture.

The present invention provides cellulose acetate compositions characterized by a unique combination of rigidity and toughness together with an ease of molding not heretofore associated with compositions of such physical properties. Their use in place of compositions heretofore known for the manufacture of molded articles by compression or by injection enable important savings to be made because of the ease with which they may be molded. They do not require to be heated to a high temperature nor for a long time, and are accordingly not subject to the discoloring effect of such treatment. They do not require high pressure, and are accordingly readily molded in equipment of ordinary construction. They may be molded on short cycles, and over rather wide ranges of molding temperature in comparison with the narrow critical ranges of molding temperature which characterize many of the cellulose acetate molding compounds heretofore known. The compounds of the invention come with an unusually high gloss from a polished mold.

Through the action of camphor in suppressing exudation, the invention makes practicable the employment of certain plasticizers which have heretofore given trouble in that respect.

As many apparently widely different embodiments of this invention may be made without departing from the spirit and scope thereof, it is to be understood that the invention is not limited to the specific embodiments thereof except as defined in the appended claims.

We claim:

1. A plastic composition comprising 100 parts of cellulose acetate and 20–60 parts of a mixed plasticizer comprising 8–38% camphor and at least 25% of a toughening exuding plasticizer.

2. A plastic composition comprising 100 parts of cellulose acetate and 20–60 parts of a mixed plasticizer consisting of 8–38% camphor and 92–62% of a toughening exuding plasticizer.

3. A plastic composition comprising 100 parts of cellulose acetate and 20–60 parts of a mixed plasticizer consisting of 8–38% camphor and 92–62% of a toughening exuding plasticizer from the group consisting of diethyl phthalate, dimethoxy ethyl phthalate, triethyl citrate, diethylene glycol di-isobutyrate, diethylene glycol dipropionate, dimethyl hexahydro phthalate, diethyl adipate, methyl phthalyl ethyl glycollate, and ethyl phthalyl ethyl glycollate.

4. A plastic composition comprising 100 parts of cellulose acetate and 20–60 parts of a mixed plasticizer consisting of 8–38% camphor, 23–31% of a fire retarding plasticizer, and 31–69% of a toughening exuding plasticizer.

5. A plastic composition comprising 100 parts of cellulose acetate and 20–60 parts of a mixed plasticizer consisting of 8–38% camphor, 23–31% of a fire retarding plasticizer from the group consisting of triphenyl and tributyl phosphates, and 31–69% of a toughening exuding plasticizer from the group consisting of diethyl phthalate, dimethoxy ethyl phthalate, triethyl citrate, diethylene glycol di-isobutyrate, diethylene glycol dipropionate, dimethyl hexahydro phthalate, diethyl adipate, methyl phthalyl ethyl glycollate, and ethyl phthalyl ethyl glycollate.

6. A plastic composition comprising 100 parts of cellulose acetate and 20–60 parts of a mixed plasticizer consisting of 8–38% camphor, 23–31% of a fire retarding plasticizer, 2–6% of an aryl sulphonamide plasticizer, and 25–67% of a toughening exuding plasticizer.

7. A plastic composition comprising 100 parts of cellulose acetate and 20–60 parts of a mixed plasticizer consisting of 8–38% camphor, 23–31% of a fire retarding plasticizer from the group consisting of triphenyl and tributyl phosphates, 2–6% of an aryl sulphonamide plasticizer from the group consisting of toluol and toluol ethyl sulphonamides, and 25–67% of a toughening exuding plasticizer from the group consisting of diethyl phthalate, dimethoxy ethyl phthalate, triethyl citrate, diethylene glycol di-isobutyrate, diethylene glycol dipropionate, dimethyl hexahydro phthalate, diethyl adipate, methyl phthalyl ethyl glycollate, and ethyl phthalyl ethyl glycollate.

8. A molding composition adapted to be injection molded and comprising 100 parts of cellulose acetate and 35–60 parts of a mixed plasticizer consisting of 13–17% camphor and 87–83% of a toughening exuding plasticizer.

9. A molding composition adapted to be injection molded and comprising 100 parts of cellulose acetate and 35–60 parts of a mixed plasticizer consisting of 13–17% camphor, 24–28% of a fire retarding plasticizer, and 55–65% of a toughening exuding plasticizer.

10. A molding composition adapted to be injection molded and comprising 100 parts of cellulose acetate and 35–60 parts of a mixed plasticizer consisting of 13–17% camphor, 24–28% of a fire retarding plasticizer, 3–5% of an aryl sulphonamide plasticizer, and 50–60% of a toughening exuding plasticizer.

MAURICE L. MACHT.
DAVID A. FLETCHER.